F. H. DENICKE.
SOLDERING IRON HEATER.
APPLICATION FILED FEB. 2, 1911.
1,034,589.
Patented Aug. 6, 1912.
2 SHEETS—SHEET 1.
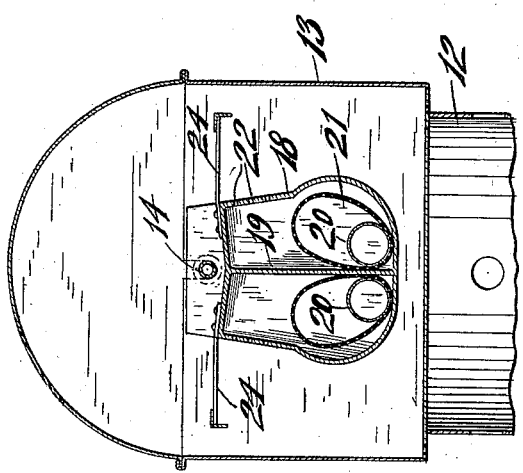
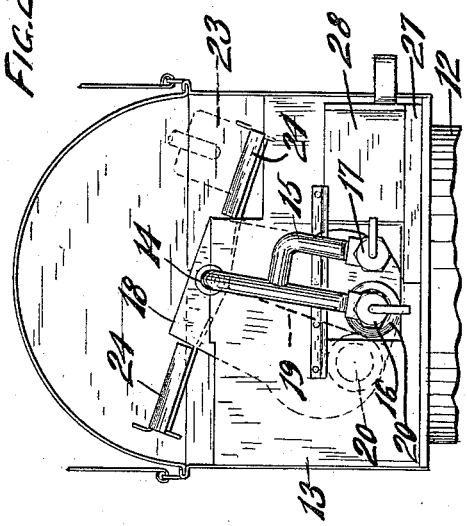
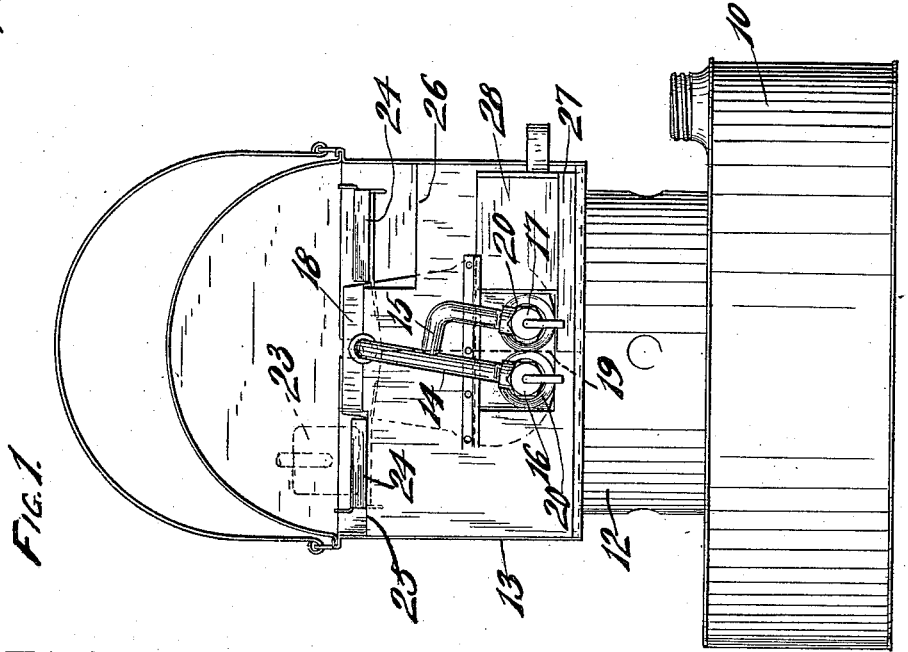
WITNESSES
INVENTOR
Fredrick H. Denicke
By Morsell & Caldwell
ATTORNEYS

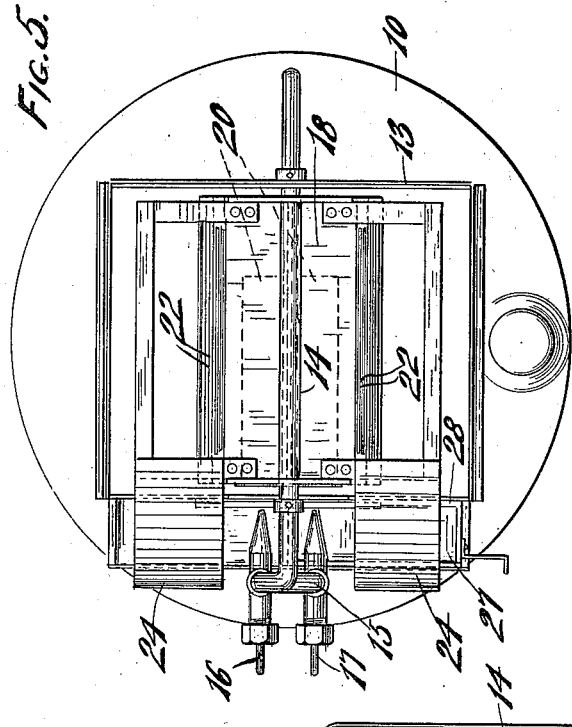
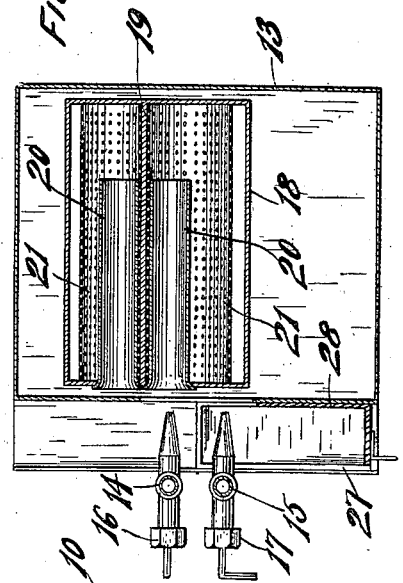
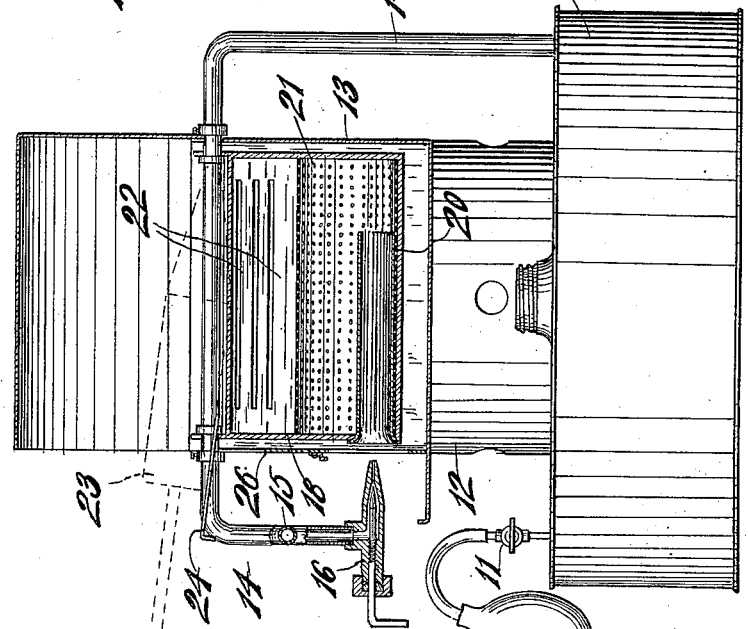

UNITED STATES PATENT OFFICE.

FREDRICK H. DENICKE, OF MAUSTON, WISCONSIN.

SOLDERING-IRON HEATER.

1,034,589.  Specification of Letters Patent.  Patented Aug. 6, 1912.

Application filed February 2, 1911. Serial No. 606,215.

*To all whom it may concern:*

Be it known that I, FREDRICK H. DENICKE, a citizen of the United States, residing in Mauston, in the county of Juneau and State of Wisconsin, have invented new and useful Improvements in Soldering-Iron Heaters, of which the following is a description, reference being had to the accompanying drawings, which are a part of this specification.

This invention has for its object to provide a soldering iron heater which is capable of heating two soldering irons with a separate rest for each adapted to automatically move from one position to another when the soldering irons are changed, so as to place in effective position with relation to the flame whichever soldering iron rest then has its soldering iron resting thereon.

Another object of the invention is to accomplish this automatic shifting of the soldering iron rests by pivotally mounting them so that the weight of the soldering irons will cause them to swing from one position to another.

With the above and other objects in view the invention consists in the soldering iron heater herein claimed, its parts and combinations of parts and all equivalents.

Referring to the accompanying drawings in which like characters of reference indicate the same parts in the different views: Figure 1 is a front elevation of a soldering iron heater constructed in accordance with this invention, the soldering iron rests being in their normal position; Fig. 2 is a similar view of a portion thereof showing the soldering iron rests in a different position; Fig. 3 is a transverse sectional view through the swinging soldering iron rests and their burners; Fig. 4 is a sectional side elevation of the device; Fig. 5 is a plan view thereof; and, Fig. 6 is a detail sectional plan view showing the position of the burner tubes after they have been moved from the position shown in dotted lines in Fig. 5.

While this invention is equally adapted for use with gas burners of various sorts, for the purpose of illustration it is shown as embodied in a gasolene burner.

In these drawings 10 indicates a base which may desirably constitute a gasolene reservoir in which gasolene is contained under pressure, the reservoir being provided with a valved bulb connection 11 through which pressure may be given to its contents in the manner common with blow torches and the like. A heat insulating perforated collar 12 supports a burner casing 13 upon the reservoir without danger of the reservoir becoming overheated from the burner casing, and a gasolene supply pipe 14 passes upwardly from the bottom of the reservoir 10 and then horizontally through the casing 13, from its rear to beyond its front, and finally extends downwardly with its end forked by means of a branch pipe 15. The end of the gasolene supply pipe 14 is provided with a needle valve nozzle 16 and its branch pipe 15 is similarly provided with a needle valve nozzle 17, said nozzles standing side by side, as clearly shown in Figs. 1, 2 and 5.

A swinging frame 18 is provided within the casing to constitute a pair of soldering iron supports and burners therefor. Said frame, as best shown in Figs. 3 and 4, is divided by a partition 19 into two burner compartments at the lower part of which are tubes 20 with flaring ends forming openings to register with the nozzles 16 and 17, said tubes being surrounded by a wire or other reticulated screen 21 for diffusing the mixture of air and gas issuing from the rear end of the tube 20 throughout the interior of the burner chambers, such mixed gas and air then passing out through slots 22 in the upper part of the frame to burn beneath soldering irons 23 which lie upon soldering iron rests 24 which are mounted on the swinging frame 18 and extend in opposite directions from the upper part thereof. The swinging frame 18 is suspended from the gasolene supply pipe 14 so as to be capable of rocking from one side to the other and thus bring either the right or the left tube 20 into register with the nozzle 16, according to whether the weight of the soldering iron is on the right or the left soldering iron rest.

The normal position of the swinging frame is that in which the left burner tube 20 registers with the nozzle 16 and the right burner tube 20 registers with the nozzle 17, this being the position of the parts when a soldering iron is on the left rest and also when soldering irons are on both rests, as well as when no soldering iron is in the heater, for the left side of the swinging frame is made slightly heavier and the left rest 24 engages a shoulder 25 of the casing to limit the swing of the frame 18 to this position. The extent of swing of the frame 18 in the other direction is limited by the engagement of the right rest 24 with a corresponding shoulder 26 of the casing, such movement of the frame being produced when a soldering iron is placed on the right rest and the soldering iron on the left rest is removed.

The usual drip cup 27 with its shield 28 is provided for use in giving preliminary heat upon starting the burners.

In use, the burner is started by first sliding the cup 27 beneath the nozzles so that its guard 28 will intercept the stream of gasolene therefrom and cause it to collect in the drip cup 27. The valve which has been opened for this purpose is then closed and the gasolene in the cup is lighted to heat the tube 14 and vaporize the gasolene therein. Then the cup is withdrawn from its position beneath the nozzles and both needle valves are opened to permit the gas therefrom to pass through both of the tubes 20 and heat the soldering irons on both of the rests 24. When the soldering irons are sufficiently heated, the needle valve 17 is closed and one of the soldering irons is used while the other remains on its rest continuing to receive the heat from the burner beneath it. When the soldering iron is removed from the left rest, the weight of the soldering iron on the right rest causes the frame to swing and bring the right burner tube 20 opposite the nozzle 16, as shown in Fig. 2, and when this is removed and the other soldering iron replaced on the left rest, its weight restores the frame 18 to its former position where the left burner tube 20 is opposite the nozzle 16, and thus the heating effect is changed from one burner to the other as the weight of the soldering irons is shifted from one side thereof to the other.

By the use of the soldering iron heater of this invention the heating fuel is economized, only one burner being in use at a time for each becomes inoperative automatically upon the iron being removed therefrom.

What I claim as new and desire to secure by Letters Patent is:

1. A heater for soldering irons and the like, comprising a pair of burners, means for movably mounting said burners and for supporting soldering irons thereupon, a single stationary burner nozzle for supplying gas to either of the said burners, said means for supporting the soldering irons being movable under the weight of the soldering irons for shifting the burners with relation to the stationary nozzle, whereby the gas will only be admitted to the burner which has the soldering iron above it.

2. A heater for soldering irons and the like, comprising a stationary fuel nozzle, a swinging frame having a pair of burners adapted in the movement of the swinging frame to be brought successively into register with the nozzle, and a soldering iron rest on the frame above each of the burners whereby the weight of the soldering iron on either rest will cause the frame to swing to bring into register with the nozzle that burner which has the soldering iron above it.

3. A heater for soldering irons and the like, comprising a stationary fuel nozzle, a rocking frame provided with a pair of burner openings adapted to be brought successively into register with the nozzle during the movements of the frame, a soldering iron rest on the rocking frame above each of the burner openings whereby the weight of a soldering iron on either rest will cause the burner opening beneath it to register with the nozzle, and a supplementary burner nozzle in position to register with one of the burner openings at such times as the other burner opening is in register with the other burner nozzle.

4. A heater for soldering irons or the like, comprising a gasolene reservoir for containing gasolene under pressure, a gasolene supply pipe leading therefrom, a valved nozzle on the end of the gasolene supply pipe, a frame pivotally mounted on the gasolene supply pipe and having a pair of burner openings adapted to successively register with the nozzle in different positions of the frame, and soldering iron rests on the frame above the respective burner openings whereby the weight of the soldering iron on either soldering iron rest causes the frame to swing to a position in which the burner opening beneath that soldering iron rest registers with the nozzle.

In testimony whereof, I affix my signature, in presence of two witnesses.

FREDRICK H. DENICKE.

Witnesses:
W. F. WINSOR,
H. D. WINSOR.

---

Copies of this patent may be obtained for five cents each, by addressing the "Commissioner of Patents, Washington, D. C."